(Model.)
J. T. HAYDEN.
Pipe Wrench.
No. 241,490.  Patented May 17, 1881.
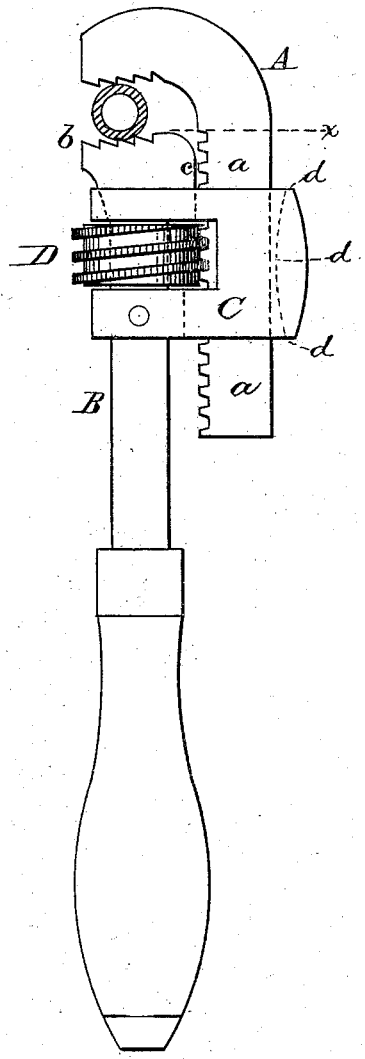
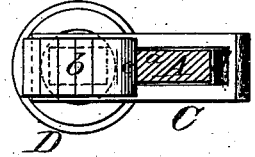
Witnesses:
J. Campbell
M. Tyrer
Inventor
James T. Hayden
per R. T. Campbell
Attorney.
N. PETERS, Photo-Lithographer, Washington, D. C.

UNITED STATES PATENT OFFICE.

JAMES T. HAYDEN, OF CAMBRIDGEPORT, MASSACHUSETTS.

PIPE-WRENCH.

SPECIFICATION forming part of Letters Patent No. 241,490, dated May 17, 1881.

Application filed March 26, 1881. (Model.)

*To all whom it may concern:*

Be it known that I, JAMES T. HAYDEN, a citizen of the United States, residing at Cambridgeport, in the county of Middlesex and State of Massachusetts, have invented a new and Improved Pipe-Wrench, of which the following is a specification.

My invention relates to pipe-wrenches in which the griping-dog is adjusted by means of a worm; and the object of my improvement is to provide for allowing the dog to oscillate or vibrate freely on the worm, and at the same time to afford the dog a bearing-fulcrum against the frame. I attain this object by the following means:

Figure 1 is a side view of my improved wrench, showing a pipe in section held between the griping-dog and jaw; Fig. 2, a top view, with the griping part of the dog broken away, the section being taken in the horizontal plane indicated by dotted line $x$, Fig. 1.

Similar letters of reference indicate like parts in both figures.

A designates the dog, B the wrench-bar, C the frame, and D the worm, which latter is milled, as shown.

The curved griping part of the dog A has teeth formed on it, which are pitched toward the straight portion or rack $a$. This rack $a$ passes loosely through the bifurcated frame C, and its teeth engage loosely with the thread of the worm D, so that by turning the latter the teeth of the dog can be made to approach or recede from the jaw $b$. The frame C receives through it and is rigidly secured to the wrench-bar D just beneath and abutting against the jaw $b$. Frame C receives loosely between its bifurcations the worm D, as shown in Fig. 1, and the worm is drilled out, so that it will turn freely around the wrench-bar B. The jaw $b$ is a serrated head formed on the end of the wrench-bar and constructed with a bearing, $c$, which is in the plane of the smallest diameter of the worm D. The object of this construction is to prevent the dog from swinging too far forward.

It will be observed that when the rack $a$ touches the bearing $c$ of jaw $b$ the former is parallel to the wrench-bar B, and that the dog cannot move farther forward. It will therefore be seen that when the dog is set for pipes of a given diameter the wrench can be quickly applied to such pipes.

At the back of the rack $a$ I form inside of the frame C a convex bearing, $d$, indicated by dotted line in Fig. 1. This convex bearing affords a fulcrum for the dog A during the act of turning a pipe in whatever position the dog may be adjusted. This curved or convex bearing $d$ allows the dog to swing freely forward and backward, but always presents to the back edge of the rack $a$ a bearing. By these means I obtain quickness of gripe and release.

What I claim is—

1. The bifurcated frame C, secured rigidly to the bar B and constructed with the convex bearing $d$, in combination with the worm D, the shoulder $c$ on jaw $b$, and dog A, with its rack $a$, all constructed and arranged in the manner and for the purposes set forth.

2. The dog A, moved by worm D and oscillating thereon, in combination with the frame C, fixed rigidly to the wrench-bar B, substantially as described.

JAMES T. HAYDEN.

Witnesses:
I. L. HAYDEN,
R. H. CAMPBELL.